United States Patent
Miyazoe

[11] Patent Number: 6,076,551
[45] Date of Patent: Jun. 20, 2000

[54] FLOW DETECTOR WITH FLOW CONTROL VALVE

[75] Inventor: Shinji Miyazoe, Ibaraki, Japan

[73] Assignee: SMC Corporation, Tokyo, Japan

[21] Appl. No.: 09/195,686

[22] Filed: Nov. 19, 1998

[30] Foreign Application Priority Data

Dec. 11, 1997 [JP] Japan ..................... 9-362030

[51] Int. Cl.⁷ ..................... E03B 7/07
[52] U.S. Cl. ............ 137/554; 137/269; 137/545; 137/884
[58] Field of Search ................. 137/551, 554, 137/884, 269, 545, 557

[56] References Cited

U.S. PATENT DOCUMENTS

| | | |
|---|---|---|
| 3,785,389 | 1/1974 | Friedland et al. . |
| 4,399,836 | 8/1983 | de Versterre et al. . |
| 4,672,997 | 6/1987 | Landis et al. . |
| 5,439,026 | 8/1995 | Moriya et al. ............ 137/884 |
| 5,603,350 | 2/1997 | Stoll et al. ............... 137/884 |
| 5,819,782 | 10/1998 | Itafuji ...................... 137/884 |

*Primary Examiner*—A. Michael Chambers
*Attorney, Agent, or Firm*—Oblon, Spivak, McClelland, Maier & Neustadt, P.C.

[57] ABSTRACT

A flow detector that can be effectively used in a clean environment (e.g., a semiconductor fabrication apparatus) and that enables the flow to be measured and regulated by an integrated apparatus. The flow detector includes a detector body having a fluid channel penetrating its interior and having a detection section of a flow sensor disposed in the fluid channel; and input and output blocks having input and output channels in communication with the fluid channel in the detector body. A flow control valve is provided in the output block. The detector body and each of the input and output blocks are joined together via seal members that seal the channels provided in the body and blocks and are fixedly connected at positions separate from the channels using screws.

3 Claims, 1 Drawing Sheet

FLOW DETECTOR WITH FLOW CONTROL VALVE

FIELD OF THE INVENTION

The present invention relates to a flow detector with a flow control valve that is suitable for use with an apparatus, such as a semiconductor fabrication apparatus, maintained in a clean environment.

PRIOR ART

A flow sensor for detecting the flow of a fluid flowing through a channel is generally incorporated into various fluid equipment or used as an independent apparatus. If the flow sensor is used independently for some general-purpose application, pipes must normally be connected to the input and output sides of the sensor; in some cases, a flow control valve is serially connected to the sensor. However, in a semiconductor fabrication facility, which is extremely susceptible to contamination by foreign matter, a connection means must be able to prevent fine foreign matter from being generated when pipes (or the flow control valves) are either connected or replaced. Threaded pipes are unsuitable, for example, because fine powder is likely to be generated on the threads as pipes are screwed together or loosened.

In addition, to improve the accuracy of flow detection, any fluid channel faced by the detection section of the flow sensor must be smoothly formed, including its portions in front and behind the detection section, without being complex. Such a configuration smoothes the flow of fluid near the detection section. Furthermore, the flow sensor must be able to be installed easily on other equipment while the channel remains smooth and unchanged.

DISCLOSURE OF THE INVENTION

It is a technical object of this invention to solve the above-noted problems in order to provide a flow detector with a flow control valve that allows a flow sensor and the flow control valve to be assembled together beforehand, so that the integrated apparatus can measure and regulate flow and can be mounted easily on various equipment without requiring a large amount of space.

It is another technical object of this invention to provide a flow detector with a flow control valve wherein a flow detector body and a block incorporating a flow control valve are integrated together beforehand, and wherein a fluid channel is smoothly formed to smooth the flow of fluid in order to improve the accuracy of flow detection.

It is still another technical object of this invention to provide a flow detector with a flow control valve that can prevent fine powder resulting from the installation or removal of screws from remaining in the channels during assembly of the flow detector or during parts replacement.

To achieve these objects, this invention provides a flow detector with a flow control valve characterized in that the detector comprises a flow detector body having a fluid channel penetrating its interior and having the detection section of a flow sensor disposed in the fluid channel; an input and an output blocks having an input and an output channels in communication with the fluid channel in the flow detector body and mounted on the input and output sides of the fluid channel in the flow detector body, respectively; and a flow control valve provided in the input block and/or the output block to regulate the flow of a fluid flowing through the channels.

In a flow detector with flow control valve of this type, it is effective to join the flow detector body and the input and output blocks together via seal members that seal the channels in the body and blocks, and to fixedly connect the flow detector body and each of the input and output blocks together at positions separate from the channels using a connection means. It is also effective if the fluid channel penetrating the flow detector body and the input and output channels in the input and output blocks at the junction with the flow detector body have an almost uniform and linear cross section, and if the mounting surfaces of the input and output blocks in which the input and output channels are opened and which are fitted on other equipment are parallel with the axis of the fluid channel in the flow detector body.

In the present flow detector with a flow control valve of this configuration, the input channel in the input block is connected to a fluid source, the output channel in the output block is in communication with a desired portion receiving a supply of a fluid, and the flow of a fluid through the input channel is detected by the detection section of the flow sensor so that the flow control valve provided in the input or output block regulates the flow of a fluid output from the output channel.

In this flow detector with a flow control valve, the input and output blocks are mounted on the input and output sides of the flow detector body and the flow control valve is provided in the input block and/or output block, so the flow can be measured and regulated by a small integrated apparatus. And since the mounted surface used to mount the detector on another apparatus and in which the channels in the input and output blocks are opened is parallel with the axis of the linear fluid channel in the flow detector body, this flow detector can be mounted easily without requiring large amounts of space, and can be used widely and effectively, as the mounting surface is provided with openings corresponding to the input and output channels in the input and output blocks.

In addition, the flow detector body, and the input and output blocks are integrated together beforehand, the channels are joined together via the seal members, and the fluid channel penetrating the flow detector body and the input and output channels in the input and output blocks at the junction with the flow detector body have an almost uniform and linear cross section. Consequently, the configuration of the fluid channels and thus the flow of fluid are smoothed to improve the accuracy of flow detection. Furthermore, the flow detector body and each of the channels provided in the input and output blocks are jointed together via the seal members, and are fixedly connected together at positions separate from the channels using a connection means. As a result, during assembly of the flow detector or replacement of parts, fine powders resulting from the installation or removal of screws are prevented from remaining in the channels.

DETAILED DESCRIPTION

Figure 1:
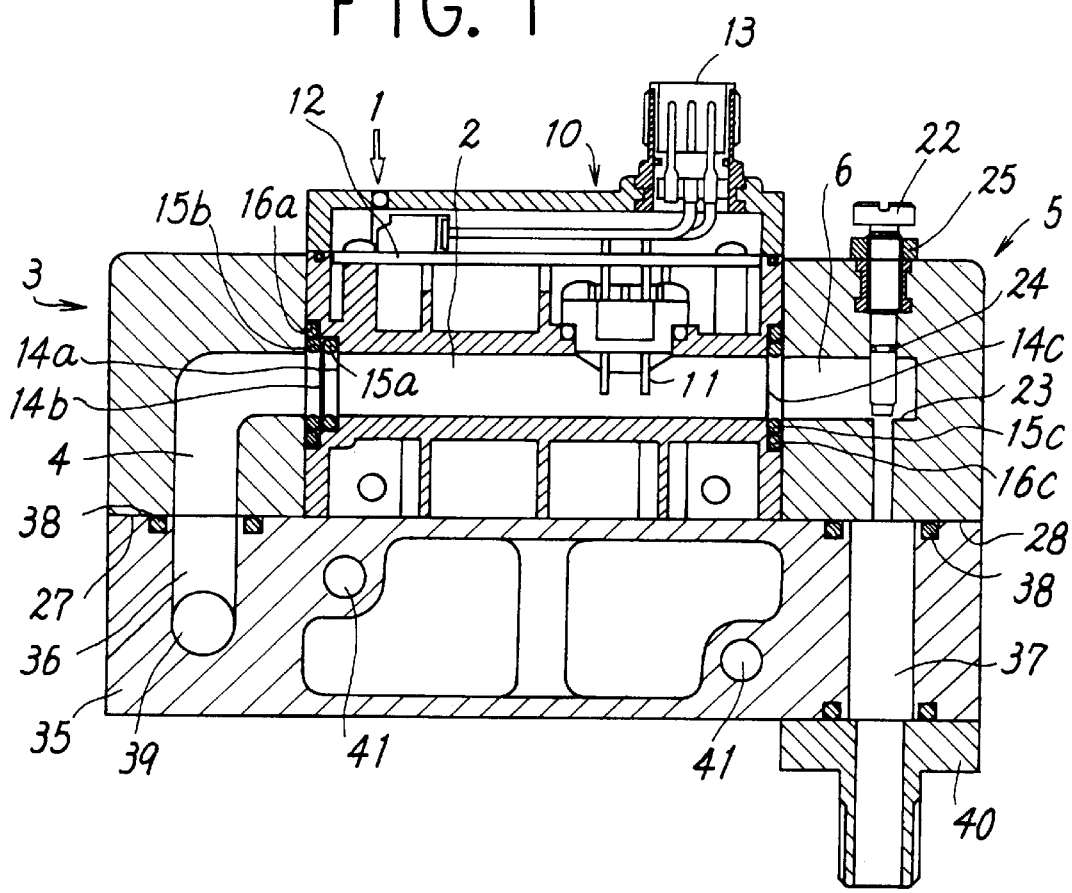
FIG. 1 is a sectional view showing an embodiment of a flow detector with a flow control valve according to this invention.
Figure 2:
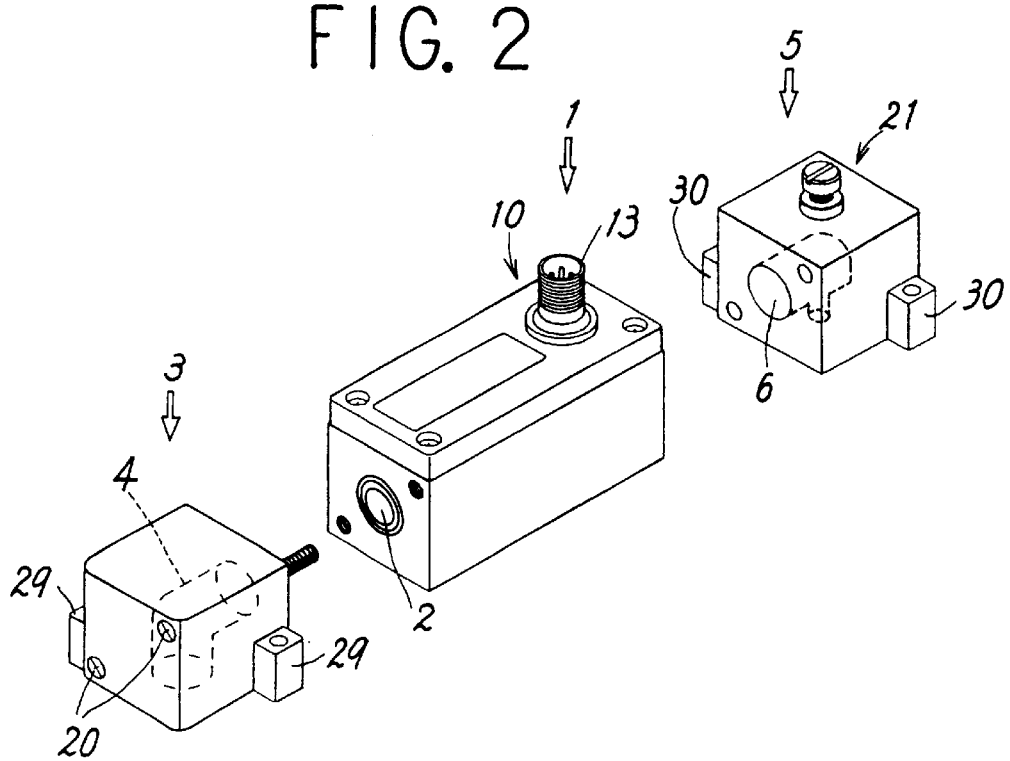
FIG. 2 is an exploded perspective view of the flow detector.

FIGS. 1 and 2 show an embodiment of a flow detector with a flow control valve according to this invention.

This flow detector is basically composed of a detector body 1 having a fluid channel 2 penetrating its interior, an input block 3 mounted on the input side of the fluid channel 2 in the detector body 1 and having an input channel 4 inside, and an output block 5 mounted on the output side of the fluid channel 2 in the detector body 1 and having an output channel 6 inside.

The detector body 1 includes a flow sensor 10 having a detection section 11 disposed in the fluid channel 2 inside the detector body. The detection section 11 is connected via a printed circuit board 12 to an electric connector 13 that is connected to a flow measuring apparatus. The illustrated flow sensor 10 is of a type that detects the heat of a fluid flowing through the fluid channel 2 at the detection section 11, but a vortex-type fluid sensor may be used instead.

The input and output channels 4 and 6 in the input and output blocks 3 and 5 mounted on the detector body 1 are in communication with the input and output sides, respectively, of the fluid channel 2 in the detector body 1.

At the connection between the detector body 1 and the input block 3, filters 14a and 14b are locked and mounted by presser rings 15a and 15b at the input-side end of the fluid channel 2 in the detector body 1, and a seal member 16a is disposed around the presser rings. In addition, at the connection between the detector body 1 and the output block 5, a filter 14c is locked and mounted by a presser ring 15c at the output-side end of the fluid channel 2, and a seal member 16c is disposed around the presser ring. Thus, the fluid channel 2 in the detector body 1 is joined with the input and output channels 4 and 6 in the input and output blocks 3 and 5 via the seal members 16a and 16c.

The detector body 1 and each of the input and output blocks 3 and 5 are connected together at the peripheral positions of each of the input and output blocks 3 and 5 at a distance from the channels 2, 4, and 6, using screws 20.

The connection means for connecting the detector body 1 and each of the input and output blocks 3 and 5 together is not limited to the screws 20; instead, an arbitrary means can be used that fixedly connects them together at positions separate from the channels 2, 4, and 6.

A flow control valve 21 that regulates the flow of a fluid flowing through the output channel 6 is provided in the output block 5. FIG. 1 shows the flow control valve 21 as a restrictor including a needle, the tip of which is opposed to a valve seat 23 of the output channel 6; the valve itself is screwed and inserted into the output block 5 via a seal member 24, and can be fixed using a lock nut 25, though another structure may be used as well. Although the figure shows that the flow control valve 21 is provided in the output block 5, it may also be provided in the input block 3 and/or output block 5.

To smooth the flow of a fluid flowing through the fluid channel 2 in the detector body 1 in order to improve the accuracy of flow detection, the fluid channel 2 in the detector body 1 has an almost uniform and linear cross section. The channels 4 and 6 in the input and output blocks 3 and 5 at the junction with the detector body 1 also have a linear cross section that is almost the same as that of the fluid channel 2. The input and output channels 4 and 6 in the input and output blocks 3 and 5, however, must be attached to another apparatus using mounting surfaces 27 and 28 that are parallel with the axis of the fluid channel 2 in the detector body 1, so they must be bent perpendicularly inside the input and output blocks 3 and 5, respectively. Thus, in the input block 3 in which the flow control valve 21 is not mounted, the input channel 4 is smoothly bent in such a way that its end is opened in the mounting surface 27, whereas in the output block 5 in which the flow control valve 21 is mounted, the output side of the flow control valve 21 is opened in the mounting surface 28 without any need to complicate the channel 6.

The flow detector consisting of the detector body 1 and the input and output blocks 3 and 5 is used with another apparatus by fitting on this apparatus the mounting surfaces 27 and 28 parallel to the axis of the fluid channel 2 in the detector body 1. The apparatus on which the flow detector is mounted has openings corresponding to the channels 4 and 6, and by simply using screws to attach to the apparatus the mounting seats 29 and 30 (FIG. 2) provided on the input and output blocks 3 and 5, respectively, both the flow detector and piping can be mounted simultaneously.

FIG. 1 shows that in order to connect a plurality of flow detectors, the mounting surfaces 27 and 28 of the input and output blocks are fitted via seal members 38 on a manifold block 35 including an input and an output openings 36 and 37 corresponding to the input and output channels 4 and 6 opened in the mounting surfaces. The manifold block 35 has a common input passage 39 with which the input opening 36 is in communication, and finally with a fluid source, in order to allow mutual communication of the input openings 36 in the plurality of manifold blocks 35 installed in parallel in a direction perpendicular to that of the sheet of the drawing. In addition, each of the flow detectors uses the output opening 37 in the manifold block 35 to detect a fluid flow; meanwhile, the fluid, the flow of which has been regulated, is output through this opening.

In the figure, 40 is a pipe joint that allows the output opening 37 to communicate with a desired portion, and 41 is a hole for a coupling bolt that connects a plurality of manifold blocks 35 together.

In the flow detector of the above configuration, the input and output blocks 3 and 5 are mounted on the input and output sides of the detector body 1, respectively, in such a way as to integrate them together; also, the flow control valve 21 is provided in the output block 5. Thus, the flow can be measured and regulated by a small integrated apparatus. Also, the mounting surfaces 27 and 28 of the input and output blocks 3 and 5 in which the channels 4 and 6 are opened are parallel with the axis of the linear fluid channel 2 in the flow detector body 2, so by providing in the mounting surface of some desired equipment or a manifold block, openings corresponding to the channels 4 and 6 in the input and output blocks 3 and 5, the flow detector can be mounted easily without requiring a large amount of space and can be used in the measurement and regulation of fluid flow.

In addition, the detector body 1 and the input and output blocks 3 and 5 are integrated together beforehand, the channels 2, 4, and 6 provided in these components are joined together via the seal members 16a and 16c, and the fluid channel 2 penetrating the detector body 1 and the channels 4 and 6 in the input and output blocks 3 and 5 at the junction with the detector body 1 have an almost uniform and linear cross section. Consequently, the configuration of fluid channels for fluid and thus the fluid flow are smoothed to improve the accuracy of flow detection, relative to when individual connections for the flow sensor or a flow control valve using pipes is employed. Furthermore, the detector body 1 and each of the channels 4 and 6 provided in the input and output blocks 3 and 5 are joined together via the seal members 16a and 16c, and are fixedly connected together at positions separate from the channels using a connection means. As a result, during assembly of the flow detector or replacement of parts, any fine powder resulting from the installation or removal of screws is prevented from remaining in the channels.

According to this invention described above, a flow detector can be provided that can be effectively and widely used in a clean environment (e.g., a semiconductor fabrication apparatus) and that is assembled with a flow control valve beforehand to enable the flow to be measured and regulated by an integrated apparatus, that high detection accuracy without requiring a large amount of space, and that can be mounted easily on various equipment.

What is claimed is:

1. A flow detector with a flow control valve wherein the detector comprises:

a flow detector body having a fluid channel penetrating its interior and having a detection section of a flow sensor disposed in the fluid channel, the detection section directly facing towards the fluid channel, the fluid channel, the fluid channel having a substantially uniform and linear cross-section;

at least one filter being mounted to an input side of the fluid channel;

at least one filter being mounted to an output side of the fluid channel;

an input and an output blocks having an input and output channels in communication with the fluid channel in said flow detector body and mounted on input and output sides of the fluid channel in the flow detector body, respectively; and a flow control valve provided in said input block and/or the output block to regulate the flow of a fluid flowing through the channels.

2. A flow detector with a flow control valve according to claim 1 wherein said flow detector body and each of the input and output blocks are joined together via seal members that seal the channels in the body and blocks and are fixedly connected at positions separate from said channels using a connection means.

3. A flow detector with a flow control valve according to claim 1 wherein the fluid channel penetrating said flow detector body and the input and output channels in the input and output blocks at the junction with the flow detector body have an almost uniform and linear cross section, and wherein the mounting surfaces of said input and output blocks in which the input and output channels are opened and which are fitted onto other equipment are parallel to the axis of the fluid channel in said flow detector body.

* * * * *